(12) United States Patent
Niimi et al.

(10) Patent No.: US 8,722,278 B2
(45) Date of Patent: May 13, 2014

(54) SOLID OXIDE FUEL CELL AND FUEL CELL MODULE COMPRISING THE SOLID OXIDE FUEL CELL

(75) Inventors: Hiroshi Niimi, Chigasaki (JP); Akira Kawakami, Kamakura (JP); Yutaka Momiyama, Yokohama (JP); Shuichiro Saigan, Chigasaki (JP)

(73) Assignee: Toto Ltd., Fukuoka-ken (JP)

( * ) Notice: Subject to any disclaimer, the term of this patent is extended or adjusted under 35 U.S.C. 154(b) by 735 days.

(21) Appl. No.: 12/579,595

(22) Filed: Oct. 15, 2009

(65) Prior Publication Data

US 2010/0098999 A1 Apr. 22, 2010

(30) Foreign Application Priority Data

Oct. 16, 2008 (JP) .................. 2008-267064

(51) Int. Cl.
*H01M 8/00* (2006.01)
*H01M 8/02* (2006.01)

(52) U.S. Cl.
CPC .......... *H01M 8/0202* (2013.01); *H01M 8/0236* (2013.01); *H01M 8/0217* (2013.01)
USPC ............................ 429/486; 429/497; 429/489

(58) Field of Classification Search
CPC ................... H01M 8/0236; H01M 2008/1293; H01M 8/0202; H01M 8/0217
USPC ................................................. 429/479–497
See application file for complete search history.

(56) References Cited

U.S. PATENT DOCUMENTS

| 6,475,657 | B1 | 11/2002 | Del Gallo et al. | |
| 2004/0028975 | A1* | 2/2004 | Badding et al. | 429/32 |
| 2007/0148521 | A1 | 6/2007 | Ukai et al. | |
| 2008/0182147 | A1* | 7/2008 | Blake et al. | 429/33 |
| 2009/0148743 | A1* | 6/2009 | Day et al. | 429/33 |
| 2009/0186250 | A1* | 7/2009 | Narendar et al. | 429/33 |
| 2011/0053041 | A1* | 3/2011 | Tucker et al. | 429/486 |

FOREIGN PATENT DOCUMENTS

| EP | 1383195 | * | 7/2003 |
| EP | 1 598 892 A1 | | 11/2005 |
| FR | 2 796 861 A | | 2/2001 |
| JP | 2005-050636 | | 2/2005 |
| JP | 2005-050636 A | | 2/2005 |
| JP | 2007-095442 | | 4/2007 |
| JP | 2008-234915 A | | 10/2008 |
| JP | 2009-199994 A | | 9/2009 |
| WO | 2007/093759 A1 | | 8/2007 |

* cited by examiner

*Primary Examiner* — Milton I Cano
*Assistant Examiner* — Stephen Yanchuk
(74) *Attorney, Agent, or Firm* — Carrier Blackman & Associates, P.C.; Joseph P. Carrier; William D. Blackman

(57) ABSTRACT

Disclosed is a solid oxide fuel cell that has a high initial power generation performance and a good power generation durability. The fuel cell comprises at least a fuel electrode, an electrolyte, an air electrode, and a current collecting part disposed on the air electrode, wherein the current collecting part comprises an electroconductive metal and an oxide, the electroconductive metal is silver and palladium, the oxide is a perovskite oxide, and the content of the oxide is more than 0 (zero) and less than 0.111 in terms of weight ratio to the electroconductive metal.

5 Claims, 3 Drawing Sheets

SOLID OXIDE FUEL CELL AND FUEL CELL MODULE COMPRISING THE SOLID OXIDE FUEL CELL

BACKGROUND OF THE INVENTION

1. Field of Invention

The present invention relates to a solid oxide fuel cell and a fuel cell module comprising the solid oxide fuel cell.

2. Background Art

A fuel cell comprising a tubular fuel cell has hitherto been known (for example, Japanese Patent 2007-95442A (PTL 1)). The conventional solid oxide fuel cell comprises an air electrode coated with a silver paste, and the silver is exposed to air.

Further, Japanese Patent 2005-50636A (PTL 2) describes a flat solid oxide fuel cell. An air electrode contact material on the inner side of the solid oxide fuel cell is held between a separator and an air electrode. The air electrode contact material comprises at least a silver powder or a silver alloy powder and a perovskite oxide powder. The mixing ratio between the silver powder or the silver alloy powder and the perovskite oxide powder is preferably silver powder or silver alloy powder:perovskite oxide powder=90:10 in terms of % by weight to 30:70 in terms of % by weight, more preferably silver powder or silver alloy powder:perovskite oxide powder=70:30 in terms of % by weight to 50:50 in terms of % by weight. The claimed advantage of the air electrode contact material is that, without significantly sacrificing a power generation performance inherent in unit cells, an excellent power generation performance under an air environment can be realized and breaking of unit cells can also be suppressed.

According to finding of the present inventors, however, the addition amount of the perovskite oxide is so large that the electric resistance is increased and the power generation performance is low, when the air electrode contact material described in this prior art technique, that is, a composition comprising at least a silver powder or a silver alloy powder and a perovskite oxide powder, is applied to a current collecting part in the solid oxide fuel battery. Further, when the content of the perovskite oxide powder is lowered, the porous nature of the air electrode contact layer is lost. In this case, the power generation performance under an air atmosphere is lowered, and, further, unit cells are likely to be broken by sticking. The loss of the porous nature of the air electrode contact layer further brings about a tendency toward a lowering in power generation durability.

Furthermore, Japanese Patent 2002-216807A (PTL 3) describes a flat solid oxide fuel cell. An air electrode current collector provided on the inner side of the solid oxide fuel cell is held between a separator and an air electrode. The air electrode current collector in the solid oxide fuel cell is formed of a dispersion-strengthening type silver porous body comprising an oxide dispersed in a silver base.

This prior art technique, however, does not disclose an air electrode current collector comprising silver and palladium and a perovskite oxide at a specific content ratio.

CITATION LIST

Patent Literature

[PTL 1] Japanese Patent 2007-95442A
[PTL 2] Japanese Patent 2005-50636A
[PTL 3] Japanese Patent 2002-216807A

SUMMARY OF INVENTION

The present inventors have now found that, when an air electrode current collector comprising silver and palladium and a perovskite oxide at a specific content ratio is applied to a solid oxide fuel cell, the solid oxide fuel cell has a high initial power generation performance and a good power generation durability. The present invention has been made based on such finding.

Accordingly, an object of the present invention is to provide a solid oxide fuel cell having a high initial power generation performance and a good power generation durability.

According to one aspect of the present invention, there is provided a solid oxide fuel cell comprising at least a fuel electrode, an electrolyte, an air electrode, and a current collecting part disposed on the air electrode, wherein the current collecting part comprises an electroconductive metal and an oxide, the electroconductive metal is silver and palladium, the oxide is a perovskite oxide, and the content of the oxide is more than 0 (zero) and less than 0.111 in terms of weight ratio to the electroconductive metal.

According to another aspect of the present invention, there is provided a fuel cell module comprising the solid oxide fuel cell according to the present invention.

DISCLOSURE OF THE INVENTION

Figure 1:
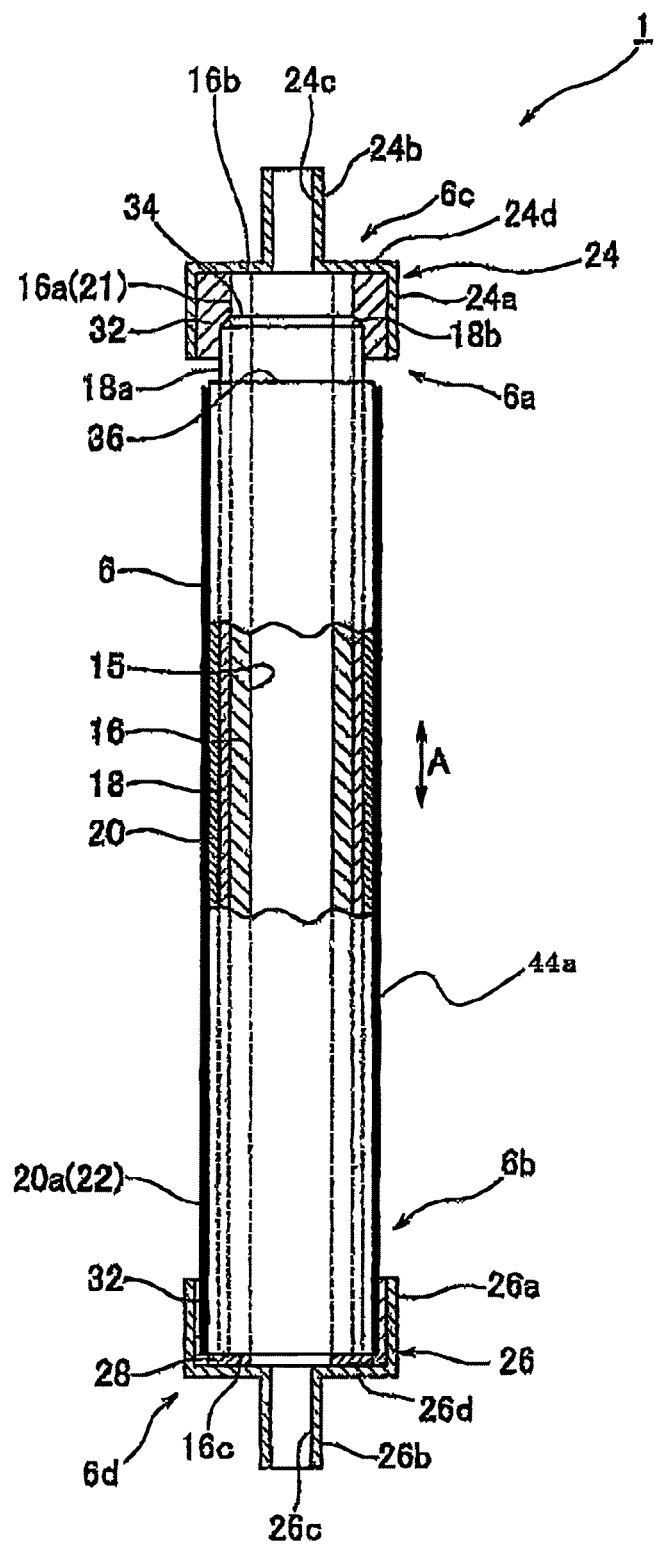
FIG. 1 is a diagram showing a solid oxide fuel cell in one embodiment of the present invention.

The fuel cell according to the present invention is the same as a cell that comprises at least a fuel electrode, an electrolyte, and an air electrode and is usually classified or understood as a solid oxide fuel cell in the art, except that a current collecting part provided on the air electrode satisfies requirements which are described herein.

In the present invention, the current collecting part disposed in the air electrode comprises an electroconductive metal and an oxide. The electroconductive metal is silver and palladium, and the oxide is a perovskite oxide. In the present invention, the content of the oxide is more than 0 (zero) and less than 0.111, preferably more than 0 (zero) and not more than 0.095, more preferably more than 0 (zero) and not more than 0.090, in terms of weight ratio to the electroconductive metal. The ratio can be determined by analyzing a surface or a cross section of the current collecting part with an electron probe micro analyzer (EPMA).

In the present invention, the perovskite oxide is preferably $La_{0.6}Sr_{0.4}Co_{0.2}Fe_{0.8}O_3$. In a preferred embodiment of the present invention, the oxide constituting the current collecting part has the same composition as the air electrode. A specific example of the oxide is a lanthanum manganite doped with at least one element selected from strontium (Sr) and calcium (Ca), a lanthanum ferrite doped with at least one element selected from strontium (Sr), cobalt (Co), nickel (Ni), and copper (Cu), or a samarium cobalt or silver doped with at least one element selected from strontium (Sr), iron (Fe), nickel (Ni), and copper (Cu).

In the present invention, the current collecting part is porous. Air is introduced through pores in the porous current collecting part and is utilized in power generation. Oxygen passed through the current collecting part is supplied into the air electrode, whereby a good power generation performance is provided. Further, in the present invention, the electroconductivity of the current collecting part is higher than that of the air electrode, and, consequently, the current collection performance can be improved. In the present invention, the porous nature of the current collecting part is approximately 20 to 80% in terms of porosity. The porosity can be determined, for example, by embedding a cross section of a sample to be measured with a resin, polishing the assembly, photographing the surface of the cross section of the sample, with a specular surface exposed thereon, with SEM and analyzing the photographed image.

The present invention will be described with reference to the accompanying drawings. For facilitating understanding of the present invention, like parts are identified with same reference numerals throughout all of the drawings unless otherwise specified.

FIG. 1 is a cross-sectional view of a solid oxide fuel cell in an embodiment of the present invention.

In FIG. 1, a fuel cell unit 1 comprises a solid oxide fuel cell 6 and a fuel electrode terminal 24 and an air electrode terminal 26 provided at respective both ends of the solid oxide fuel cell 6. In this embodiment, The solid oxide fuel cell comprises one solid oxide fuel cell 6 (tubular body), and the solid oxide fuel cell 6 is cylindrical.

The solid oxide fuel cell 6 has a laminate structure comprising a current collecting part 44a, an air electrode 20, an electrolyte 18, and a fuel electrode 16 as viewed from the surface of the solid oxide fuel cell 6 exposed to an oxidizing agent gas. The solid oxide fuel cell 6 has a through-flow passage 15 that is provided on the inner side of the fuel electrode 16 and functions as a passage for a fuel gas. The current collecting part 44a is connected to the air electrode terminal 26 fixed to the other end 6b of the solid oxide fuel cell 6. The whole or a part of the air electrode 20 is covered with the current collecting part 44a. Electricity generated in the air electrode 20 flows in a cell axial direction of the current collecting part 44a and is taken out from the air electrode terminal 26. The cell axial direction refers to a direction identical to the direction of the fuel gas that flows through the through-flow passage 15. In the drawing, the cell axial direction is indicated by an arrow A.

On the other hand, the fuel electrode terminal 24 fixed to one end 6a of the solid oxide fuel cell 6 is in contact with the fuel electrode 16 and functions to taken out electricity generated in the fuel electrode 16 from the fuel electrode terminal 24.

The current collecting part 44a should satisfy the above requirements. In a preferred embodiment of the present invention, the thickness of the current collecting part 44a is 0.1 to 50 µm, more preferably 0.5 to 30 µm.

The fuel electrode 16 is formed of, for example, at least one of a mixture of nickel (Ni) with zirconia doped with at least one element selected from calcium (Ca) and rare earth elements such as yttrium (Y) and scandium (Sc), a mixture of Ni with ceria doped with at least one element selected from rare earth elements, and a mixture of Ni with lanthanum gallate doped with at least one element selected from Sr, magnesium (Mg), Co, Fe, and Cu.

The electrolyte 18 is formed of, for example, at least one of zirconia doped with at least one element selected from rare earth elements such as Y and Sc, ceria doped with at least one element selected from rare earth elements, and lanthanum gallate doped with at least one element selected from Sr and Mg.

The air electrode 20 is formed of, for example, at least one of lanthanum manganite doped with at least one element selected from Sr and Ca, lanthanum ferrite doped with at least one element selected from Sr, Co, Ni, and Cu, and samarium cobalt and silver doped with at least one element selected from Sr, Fe, Ni, and Cu, and the like.

The thickness of the fuel electrode 16 is generally approximately 1 to 5 mm. The thickness of the electrolyte 18 is generally approximately 1 to 100 µm. The thickness of the air electrode 20 is generally approximately 1 to 50 µm.

A fuel electrode protruded peripheral surface 16a, in which the fuel electrode 16 is protruded relative to the electrolyte 18 and the air electrode 20, and an electrolyte protruded peripheral surface 18a, in which the electrolyte 18 is protruded relative to the air electrode 20, are provided on one end 6a of the solid oxide fuel cell 6. The fuel electrode protruded peripheral surface 16a and the electrolyte protruded peripheral surface 18a constitute the outer peripheral surface of the solid oxide fuel cell 6. In the outer peripheral surface of the remaining part including the other end 6b of the solid oxide fuel cell 6, the air electrode 20 is covered with the current collecting part 44a. In this embodiment, the fuel electrode protruded peripheral surface 16a is also a fuel electrode outer peripheral surface 21 connected electrically to the fuel electrode 16.

The fuel electrode terminal 24 comprises a body part 24a, which is disposed so as to cover the whole circumference of the fuel electrode outer peripheral surface 21 from the outside of the fuel electrode outer peripheral surface 21 and is connected electrically to the fuel electrode outer peripheral surface 21, and a tubular part 24b, which is extended in a longitudinal direction of the solid oxide fuel cell 6 so that a distance from the solid oxide fuel cell 6 is increased. Preferably, the body part 24a and the tubular part 24b are cylindrical and are concentrically disposed. The tube diameter of the tubular part 24b is smaller than the tube diameter of the body part 24a. The body part 24a and the tubular part 24b have a connecting flow passage 24c that is in communication with the through-flow passage 15 and is connected to the outside of the solid oxide fuel cell unit 1. A step part 24d between the body part 24a and the tubular part 24b is abutted against an end face 16b of the fuel electrode 16.

Further, in this embodiment, the air electrode terminal 26 comprises a body part 26a, which is disposed so as to cover the whole circumference of an air electrode outer peripheral surface 22 from the outside of the air electrode outer peripheral surface 22 and is connected electrically to the air electrode outer peripheral surface 22, and a tubular part 26b, which is extended in a longitudinal direction of the solid oxide fuel cell 6 so as to increase a distance from the solid oxide fuel cell 6. Preferably, the body part 26a and the tubular part 26b are cylindrical and are concentrically disposed. The tube diameter of the tubular part 26b is smaller than the tube diameter of the body part 26a. The body part 26a and the tubular part 26b have a connecting flow passage 26c that is in communication with the through-flow passage 15 and is connected to the outside of the solid oxide fuel cell unit 1. A step part 26d between the body part 26a and the tubular part 26b is abutted against the current collecting part 44a, the air electrode 20, electrolyte 18, and an end face 16c of the fuel electrode 16 through an annular insulating member 28.

Preferably, the tubular part 24b in the fuel electrode terminal 24 and the tubular part 26b in the air electrode terminal 26 are identical to each other in the sectional shape of the outer contour. More preferably, the whole shape of the fuel electrode terminal 24 is identical to the whole shape of the air electrode terminal 26. The fuel electrode terminal 24 and the air electrode terminal 26 are formed of a heat resistant metal such as silver (Ag), a stainless steel, a nickel base alloy, or a chromium base alloy.

The fuel electrode terminal 24 and the solid oxide fuel cell 6 are sealed and fixed over the whole circumference thereof with an electroconductive seal material 32. The air electrode terminal 26 and the fuel cell 6 are sealed and fixed over the whole circumference thereof with an electroconductive seal material 32.

In the one end 6a, the fuel electrode protruded peripheral surface 16a and the electrolyte protruded peripheral surface 18a are extended over the whole circumference of the solid oxide fuel cell 6 and are adjacent to each other in a longitudinal direction A. Further, the fuel electrode protruded peripheral surface 16a is located at a front end 6c of the solid oxide fuel cell 6. A boundary 34 between the fuel electrode protruded peripheral surface 16a and the electrolyte protruded peripheral surface 18a is located within the body part 24a in the fuel electrode terminal 24. A boundary 36 between the electrolyte protruded peripheral surface 18 and the current collecting part protruded peripheral surface 44 is located on the outside of the body part 24a. The electrolyte protruded peripheral surface 18a has a taper part 18b with the thickness thereof being reduced toward the fuel electrode protruded peripheral surface 16a.

In the one end 6a, the seal material 32 astrides the fuel electrode protruded peripheral surface 16a and the electrolyte protruded peripheral surface 18a, is extended over the whole circumference thereof, is filled into the body part 24a in the fuel electrode terminal 24, and is distant from the air electrode 20 through the electrolyte protruded peripheral surface 18a. In the other end 6b, the seal material 32 is extended on the air electrode protruded peripheral surface 20a over the whole circumference thereof and is filled into a space between the body part 26a in the air electrode terminal 26 and the insulating member 28. The seal material 32 is provided so as to partition an area of gas, which acts on the fuel electrode 16, that is, the through-flow passage 15 and the connecting flow passages 24c, 26c, from an area of gas, which acts on the air electrode 20. Various brazing materials including silver, a mixture of silver with glass, gold, nickel, copper, or titanium are used as the seal material 32.

The principle of operation of the solid oxide fuel cell will be described. When an oxidizing agent gas is allowed to flow into the air electrode while a fuel gas (for example $H_2$ or CO) is allowed to flow into the fuel electrode, oxygen in the oxidizing agent gas is converted to oxygen ions at a portion around the interface of the air electrode and the solid electrolyte. The oxygen ions are passed through the solid electrolyte and reach the fuel electrode, and the fuel gas is reacted with the oxygen ions to give water and carbon dioxide. These reactions are expressed by formulae (1), (2), and (3). The generated electrons are moved to the air electrode or the fuel electrode and are collected in the terminal. Accordingly, electricity flows in the longitudinal direction of the tubular cell. The electricity can be taken out to the outside of the fuel cell unit 1 by connecting the air electrode and the fuel electrode with an external circuit.

$$H_2 + O_2^- \rightarrow H_2O + 2e^- \tag{1}$$

$$CO + O_2^- \rightarrow CO_2 + 2e^- \tag{2}$$

$$\tfrac{1}{2}O_2 + 2e^- \rightarrow O_2^- \tag{3}$$

More specifically, in FIG. 1, gas (fuel gas), which acts on the fuel electrode 16, is passed into the through-flow passage 15 and the connecting flow passages 24c, 26c. On the other hand, gas (oxidizing agent gas), which acts on the air electrode 20, is allowed to flow around the air electrode 20. Thus, the solid oxide fuel cell 6 is activated. Electricity in the fuel electrode 16 is taken out through the seal material 32 and the fuel electrode terminal 24, and electricity in the air electrode 20 is taken out through the seal material 32 and the air electrode terminal 26.

Figure 2:
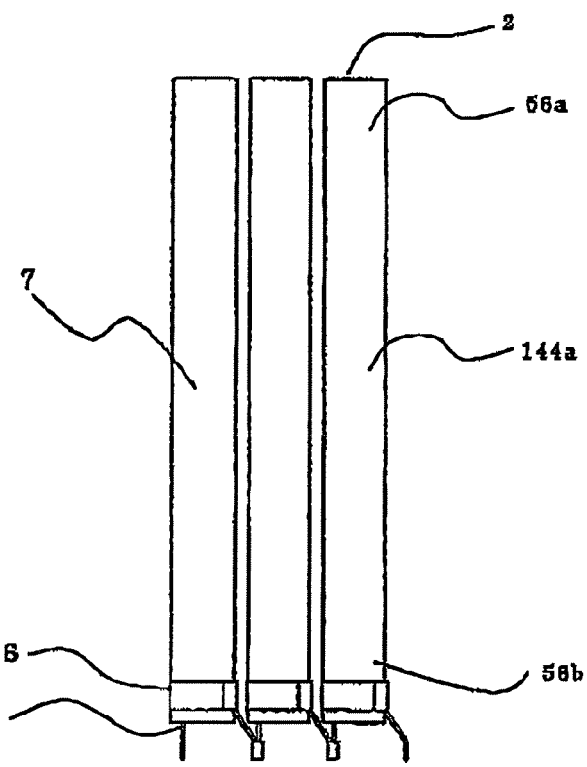
FIG. 2 is a diagram showing a solid oxide fuel cell unit in another embodiment of the present invention.
Figure 3:
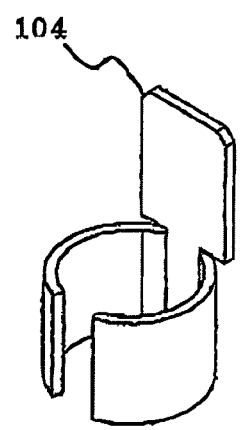
FIG. 3 is a diagram showing an example of a fuel electrode terminal in the solid oxide fuel cell unit shown in FIG. 2.
Figure 4:
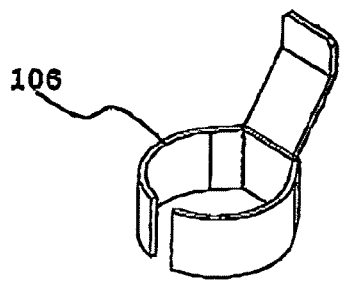
FIG. 4 is a diagram showing an example of an air electrode terminal in the solid oxide fuel cell unit shown in FIG. 2.

FIG. 2 is a diagram showing an embodiment of a solid oxide fuel cell unit in another embodiment of the present invention. A cell unit 2 comprises a solid oxide fuel cell 7 and two terminals. The solid oxide fuel cell 7 comprises a solid electrolyte provided on the outer side of a fuel electrode support having a through-flow passage in its interior, and an air electrode provided on the outer side of the solid electrolyte. A current collecting part is provided on the outer side of the air electrode. The solid oxide fuel cell 7 comprises one end 56a and the other end 56b. The other end 56b has two terminals. Specifically, a fuel electrode terminal 104 is provided on the inner side of the other end 56b, and an air electrode terminal 106 is provided on the outer side of the other end 56b. FIG. 3 shows the fuel electrode terminal 104 provided on the inner side of the other end 56b. The fuel electrode terminal 104 is inserted into the through-flow passage in the fuel electrode and is in contact with the fuel electrode. The fuel electrode terminal 104 is substantially cylindrical from the viewpoint of increasing the area of contact with the solid oxide fuel cell 7 inserted in its central part. FIG. 4 is the air electrode terminal 106 provided on the outer side of the other end 56b. The air electrode terminal 106 is in contact with a current collecting part 144a covering the outer side of the air electrode. The air electrode terminal 106 is substantially cylindrical so that the solid oxide fuel cell 7 can be inserted in the central part of the air electrode terminal 106. The fuel electrode terminal 104 and the air electrode terminal 106 are formed of a heat resistant metal such as silver (Ag), a stainless steel, a nickel base alloy, or a chromium base alloy and are fixed to the cell by utilizing a spring force possessed by the metal. As with the embodiment shown in FIG. 1, when an oxidizing agent gas is allowed to flow into the air electrode while a fuel gas (for example, $H_2$ or CO) is allowed to flow into the fuel electrode, electricity is generated in the air electrode and the fuel electrode and is collected in the fuel electrode terminal 106 and the fuel electrode terminal 104, whereby current flows in the longitudinal direction of the tubular cell.

Figure 5:
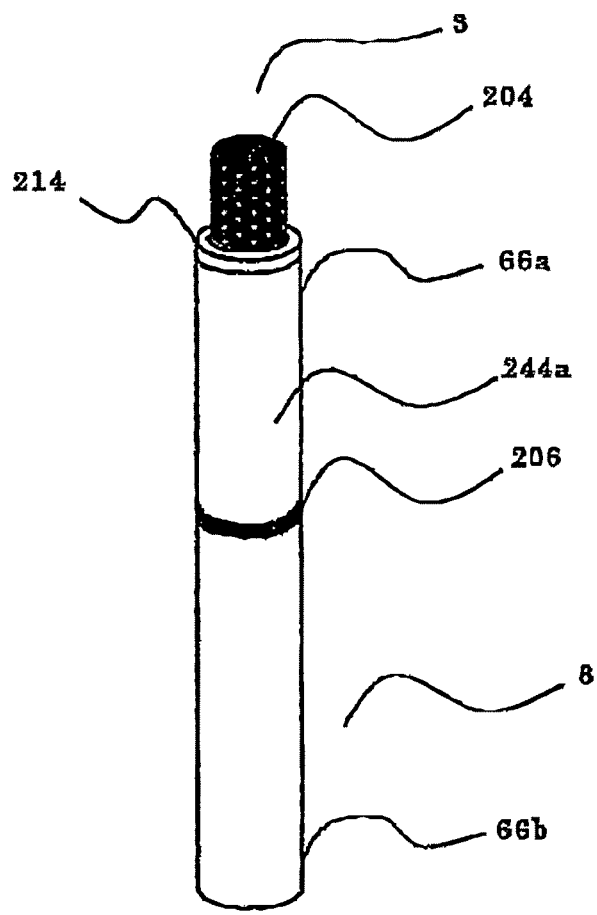
FIG. 5 is a diagram showing a solid oxide fuel cell unit in a further embodiment of the present invention.

FIG. 5 is a solid oxide fuel cell unit 3 in a further embodiment of the present invention. The solid oxide fuel cell unit 3 has a cell construction comprising a solid electrolyte provided on the outer side of a fuel electrode support having a through-flow passage in its interior, and an air electrode provided on the outer side of the solid electrolyte. A current collecting part is provided on the outer side of the air electrode. In the solid oxide fuel cell unit 3, a solid oxide fuel cell 8 comprises one end 66a and the other end 66b. An electrolyte protruded part 214, in which the electrolyte is protruded relative to the air electrode, is provided at the one end 66a. An Ag wire, which is an air electrode terminal 206, is wound around the outer circumference of the current collecting part 244a and is provided around the center of the solid oxide fuel cell 8. The current collecting part 244a at its position around which the wire is wound, however, is not limited to the position around the center of the current collecting part 244a, and the wire may be wound around the other end 66b of the solid oxide fuel cell 8. A fuel electrode terminal 204 comprises a cylindrical Ag mesh having a size larger than the inner diameter of the through-flow passage. The fuel electrode terminal 204 is inserted into the solid oxide fuel cell 8 to a depth of 10 to 100 mm from the one end 66a and is brought to contact with the fuel electrode by a spring force of the Ag mesh. As with the embodiment shown in FIG. 1, when an oxidizing agent gas is allowed to flow into the air electrode while a fuel gas (for example, $H_2$ or CO) is allowed to flow into the fuel electrode, electricity is generated in the air electrode and the fuel electrode and is collected in the air electrode terminal 206 and the fuel electrode terminal 204, whereby current flows in the longitudinal direction of the tubular cell.

The solid oxide fuel cells have been described above. However, the above constructions may also be applied to a solid oxide fuel cell module comprising a solid oxide fuel cell that is housed in an insulating container and is exposed to an oxidizing agent gas.

In the present invention, the shape of the solid oxide fuel cell is not limited to a cylindrical shape and may have a flat shape or the like.

The solid oxide fuel cell according to the present invention may be properly manufactured by a conventional method. The current collecting part provided on the air electrode may be appropriately formed by a method similar to the conventional method. A preferred manufacturing method is as follows. At the outset, silver, palladium, and oxide powders are provided and are weighed so as to give a composition identical to the compositon of the final current collecting part. The powders, together with a resin, are mixed with a solvent to give a coating liquid. The coating liquid is coated onto an air electrode, and the coating is dried and is then fired to form a current collector. The coating liquid may be coated onto the air electrode by slurry coating, tape casting, doctor blading, screen printing, spin coating, spraying, flow coating, and roll coating which may be used either solely or in a combination of two or more. Examples of resins usable herein include polyurethane resins, acrylic resins, epoxy resins, and phenol resins. Solvents include ethanol, methanol, α-terpineol, dihydroterpineol, n-methyl-2-pyrrolidone, benzyl alcohol, toluene, acetonitrile, 2-phenoxyethanol, and mixed solvents thereof. The coverage of the coating liquid onto the air electrode may be properly determined by taking into consideration the thickness of the final current collecting part. Preferably, the coating is dried at about 50 to 150° C. for 0.5 to 5 hr and is fired at about 400 to 800° C. for 0.5 to 5 hr.

EXAMPLES

The following Examples further illustrate the present invention.

Example 1

At the outset, a fuel electrode support was produced as follows. Specifically, a mixture of an NiO powder with a powder of $(ZrO_2)_{0.90}(Y_2O_3)_{0.10}$ (hereinafter abbreviated to "YSZ") was prepared by a wet mixing process. The mixture was heat treated and ground to give a raw material powder for a fuel electrode support. The mixing ratio between the NiO powder and the YSZ powder was 65/35 in terms of weight ratio. The powder was extruded to form a cylindrical extruded product. The extruded product was heat treated at 900° C. to prepare a calcined product of a fuel electrode support.

A solid electrolyte film was formed by slurry coating on the surface of the fuel electrode support and was fired at 1300° C. The fuel electrode support with the solid electrolyte formed thereon had an outer diameter of 10.4 mm, a wall thickness of 1.5 mm, and an effective cell length of 100 mm in terms of dimension after firing.

Next, an air electrode was formed by slurry coating on the surface of the solid electrolyte, followed by firing at 1100° C. As shown in Table 1, $La_{0.6}Sr_{0.4}Co_{0.2}Fe_{0.8}O_3$ (hereinafter abbreviated to "LSCF") was used as the air electrode. The area of the air electrode was 25.2 $cm^2$.

Next, the following coating liquid was coated onto the air electrode to form a current collecting part. The coating liquid comprised a resin, a solvent, and a metal powder. Specifically, a polyurethane resin was used as the resin, a mixed solvent composed of n-methyl-2-pyrrolidone (NMP) and benzyl alcohol at a mixing ratio of 50:50 was used as the solvent, an Ag powder and a Pd powder were used as the powder of the electroconductive metal, and $La_{0.6}Sr_{0.4}Co_{0.2}Fe_{0.8}O_3$ (LSCF), which was also used as the air electrode material, was used as the oxide. The materials were weighed in respective amounts specified in Table 1 (total amount of the metal powder and the oxide=100% by weight; 90.0% by weight of Ag, 2.0% by weight of Pd, and 8.0% by weight of LSCF). The resin, the solvent, the metal powder, and the oxide powder were mixed together, and the mixture was stirred. In Table 1, "wt %" of the additive materials is % by weight of the metal powder (Ag, Pd) and the oxide (LSCF) contained in the current collecting part when the amount of the current collecting part was presumed to be 100% by weight. The content of the oxide in the current collecting part was 0.087 in terms of the ratio to the electroconductive metal.

The coating liquid was coated onto the solid oxide fuel cell by screen printing. The coating was then dried at 80° C. for 30 min, was cooled at room temperature, and was then fired at 700° C. for one hr to produce a solid oxide fuel cell comprising the current collecting part provided on the outer side of the air electrode. Thus, the current collecting part in the solid oxide fuel cell was formed of a film comprising Ag, Pd, and LSCF. More specifically, the current collecting part was formed of a film comprising 90.0% by weight of Ag, 2.0% by weight of Pd, and 8.0% by weight of LSCF.

The content of an alloy containing Ag, Pd, and LSCF in the current collecting part was determined by subjecting the surface and cross section of the current collecting part in the cell to EPMA analysis. The content of the alloy was as shown in Table 1.

Example 2

A solid oxide fuel cell comprising a current collecting part provided on the outer side of an air electrode was produced in the same manner as in Example 1, except that, as shown in Table 1, the contents of the metal powder and the oxide powder in the current collecting part were 92.0% by weight for Ag, 2.0% by weight for Pd, and 6.0% by weight for LSCF. The content of the oxide in the current collecting part was 0.064 in terms of ratio to the electroconductive metal.

Example 3

A solid oxide fuel cell comprising a current collecting part provided on the outer side of an air electrode was produced in the same manner as in Example 1, except that, as shown in Table 1, the contents of the metal powder and the oxide powder in the current collecting part were 94.0% by weight for Ag, 2.0% by weight for Pd, and 4.0% by weight for LSCF. The content of the oxide in the current collecting part was 0.042 in terms of ratio to the electroconductive metal.

Example 4

A solid oxide fuel cell comprising a current collecting part provided on the outer side of an air electrode was produced in the same manner as in Example 1, except that, as shown in Table 1, the contents of the metal powder and the oxide powder in the current collecting part were 96.0% by weight for Ag, 2.0% by weight for Pd, and 2.0% by weight for LSCF. The content of the oxide in the current collecting part was 0.020 in terms of ratio to the electroconductive metal.

Example 5

A solid oxide fuel cell comprising a current collecting part provided on the outer side of an air electrode was produced in the same manner as in Example 1, except that, as shown in Table 1, the contents of the metal powder and the oxide powder in the current collecting part were 97.0% by weight for Ag, 2.0% by weight for Pd, and 1.0% by weight for LSCF. The content of the oxide in the current collecting part was 0.010 in terms of ratio to the electroconductive metal.

Example 6

A solid oxide fuel cell comprising a current collecting part provided on the outer side of an air electrode was produced in the same manner as in Example 1, except that, as shown in Table 1, the contents of the metal powder and the oxide powder in the current collecting part were 97.5% by weight for Ag, 2.0% by weight for Pd, and 0.5% by weight for LSCF. The content of the oxide in the current collecting part was 0.005 in terms of ratio to the electroconductive metal.

Comparative Example 1

A solid oxide fuel cell comprising a current collecting part provided on the outer side of an air electrode was produced in the same manner as in Example 1, except that, as shown in Table 1, the contents of the metal powder and the oxide powder in the current collecting part were 68.0% by weight for Ag, 2.0% by weight for Pd, and 30.0% by weight for LSCF. The content of the oxide in the current collecting part was 0.429 in terms of ratio to the electroconductive metal.

Comparative Example 2

A solid oxide fuel cell comprising a current collecting part provided on the outer side of an air electrode was produced in the same manner as in Example 1, except that, as shown in Table 1, the contents of the metal powder and the oxide powder in the current collecting part were 88.0% by weight for Ag, 2.0% by weight for Pd, and 10.0% by weight for LSCF. The content of the oxide in the current collecting part was 0.111 in terms of ratio to the electroconductive metal.

Comparative Example 3

As shown in Table 2, a solid oxide fuel cell was produced in the same manner as in Example 1, except that the current collecting part had a two-layer structure comprising a first layer of Ag and Pd and a second layer of Ag formed on the first layer. Two types of coating liquids were provided for current collecting part formation. At the outset, a polyurethane resin was used as the resin, a mixed solvent composed of n-methyl-2-pyrrolidone (NMP) and benzyl alcohol at a mixing ratio of 50:50 was provided as the solvent, and an Ag powder and a Pd powder were provided as the powder of the electroconductive metal. The metal powders were weighed as specified in Table 2. That is, 98.0% by weight of Ag and 2.0% by weight of Pd were weighed as the metal powder in a first solution. A solution of 100% by weight of Ag was provided as a second solution to be coated onto the coating formed using the first solution. In this case, the resin and solvent as used in the first solution and 100% by weight of Ag were weighed. The resin, the solvent, and the metal powder were mixed together, and the mixture was stirred. In Table 2, "wt %" of the additive materials is % by weight of the metal powder (Ag, Pd) contained in the current collecting part when the amount of the current collecting part was presumed to be 100% by weight. The content of the oxide in the current collecting part was 0.000 in terms of the ratio to the electroconductive metal.

The first solution was coated onto the air electrode in the solid oxide fuel cell, and the coated air electrode was then dried at 80° C. for 30 min and was cooled at room temperature. The second solution was then coated thereon, and the assembly was dried at 80° C. for 30 min, was cooled at room temperature, and was then fired at 700° C. for one hr to produce a solid oxide fuel cell comprising the current collecting part provided on the outer side of the air electrode. That is, in the solid oxide fuel cell, the current collecting part was formed of an Ag/Pd alloy, and only Ag was exposed on the surface side without exposure of Pd on the surface side.

The content of an alloy containing Ag and Pd in the current collecting part was determined by subjecting the surface or cross section of the current collecting part in the cell to EPMA analysis. The content thus determined was equal to that shown in Table 2. Specifically, the first solution coated part was an Ag/Pd alloy comprising 98.0% by weight of Ag and 2.0% by weight of Pd, and the second solution coated part was 100% by weight of Ag.

Evaluation Test

1. Evaluation on Power Generation Durability of Solid Oxide Fuel Cell

Power generation was performed using a mixed gas composed of $H_2$ and $N_2$ as a fuel. The utilization rate of fuel was 75%. Air was used as an oxidizing agent gas. The power generation potential was measured under conditions of a measuring temperature of 700° C. and a current density of 0.3 $A/cm^2$. The percentage change of power generation potential from the initial power generation potential was determined as a percentage potential lowering. The percentage potential lowering after a 100-hr durability test exhibits a power generation performance retention of the solid oxide fuel cell. The lower the percentage potential lowering, the better the solid oxide fuel cell performance.

The evaluation results were as shown in Table 1.

TABLE 1

| Air electrode material | Addition weight in current collecting part | | | | | | Oxide/ Electroconductive metal LSCF/ (Ag + Pd) | Percentage potential lowering [%/100 hr] | |
|---|---|---|---|---|---|---|---|---|---|
| | wt % | | wt % | | wt % | | | | |
| Example 1 | LSCF | Ag | 90 | Pd | 2 | LSCF | 8 | 0.087 | 0.234 | ○ |
| Example 2 | LSCF | Ag | 92 | Pd | 2 | LSCF | 6 | 0.064 | 0.215 | ○ |
| Example 3 | LSCF | Ag | 94 | Pd | 2 | LSCF | 4 | 0.042 | 0.187 | ◉ |
| Example 4 | LSCF | Ag | 96 | Pd | 2 | LSCF | 2 | 0.020 | 0.184 | ◉ |
| Example 5 | LSCF | Ag | 97 | Pd | 2 | LSCF | 1 | 0.010 | 0.183 | ◉ |
| Example 6 | LSCF | Ag | 97.5 | Pd | 2 | LSCF | 0.5 | 0.005 | 0.213 | ○ |
| Comparative Example 1 | LSCF | Ag | 68 | Pd | 2 | LSCF | 30 | 0.429 | 1.780 | X |
| Comparative Example 2 | LSCF | Ag | 88 | Pd | 2 | LSCF | 10 | 0.111 | 1.720 | X |

For Examples 1 to 6, the power generation durability was good. In particular, for Examples 3 to 5, the percentage potential lowering indicating power generation durability after 100 hr was good and on the order of 0.18%. For Examples 1 to 6 which exhibited a good power generation performance, the microstructure of the current collecting part was observed under SEM (scanning electron microscope). As a result, a number of pores were observed on the surface and cross section of the current collecting part, suggesting that, by virtue of the pores in the current collecting part, a satisfactory amount of oxygen was passed through the current collecting part and was supplied to the air electrode resulting in the good power generation performance.

By contrast, for Comparative Examples 1 and 2, the percentage potential lowering after 100 hr was high and not less than 1.0%. Further, for the Comparative Examples, the adhesion of the current collecting part to the air electrode LSCF as the base material was deteriorated resulting in increased percentage potential powering.

TABLE 2

| Air electrode material | 1st layer of current collecting part | | | | 2nd layer of current collecting part | | Oxide/ Electroconductive metal LSCF/ (Ag + Pd) | Percentage potential lowering [%/100 hr] | |
|---|---|---|---|---|---|---|---|---|---|
| | wt % | | wt % | | wt % | | | | |
| Comparative Example 3 | LSCF | Ag | 98 | Pd | 2 | Ag | 100 | 0.000 | 1.023 | X |

For Comparative Example 3, the microstructure of the current collecting part was observed under SEM (scanning electron microscope). As a result, very few of pores were observed on the surface and cross section of the current collecting part

What is claimed is:

1. A solid oxide fuel cell comprising a fuel electrode, an electrolyte, an air electrode, and a current collecting part on the air electrode, wherein:

the electrolyte is sandwiched between the fuel electrode and the air electrode, the air electrode is sandwiched between the electrolyte and the current collecting part, the current collecting part comprises an electroconductive metal and an oxide, the electroconductive metal comprises silver and palladium, the oxide is a perovskite oxide comprising a lanthanum ferrite doped with at least one element selected from strontium (Sr) and cobalt (Co), and the content of the oxide is in a range of at least 0.005 to 0.087 or less in terms of weight ratio to the electroconductive metal.

2. The solid oxide fuel cell according to claim 1, wherein the perovskite oxide is $La_{0.6}Sr_{0.4}Co_{0.2}Fe_{0.8}O_3$.

3. The solid oxide fuel cell according to claim 1, wherein the oxide has the same composition as the air electrode.

4. A solid oxide fuel cell module comprising a fuel cell according to claim 1.

5. The solid oxide fuel cell according to claim 1, wherein the content of the oxide is in a range of at least 0.010 to 0.042 or less in terms of weight ratio to the electroconductive metal.

* * * * *